(12) United States Patent  
Thompson

(10) Patent No.: US 7,841,774 B2  
(45) Date of Patent: Nov. 30, 2010

(54) SEALED BEARING

(75) Inventor: Stephen Thompson, Edmonton (CA)

(73) Assignee: QA Bearing Technologies Ltd., Alberta (CA)

( * ) Notice: Subject to any disclaimer, the term of this patent is extended or adjusted under 35 U.S.C. 154(b) by 609 days.

(21) Appl. No.: 11/846,008

(22) Filed: Aug. 28, 2007

(65) Prior Publication Data

US 2008/0267547 A1 Oct. 30, 2008

(51) Int. Cl.  
F16C 33/76 (2006.01)

(52) U.S. Cl. .................. 384/607; 384/489; 384/903

(58) Field of Classification Search .............. 384/94, 384/477, 489, 590, 601, 607, 617, 618, 620, 384/622, 903; 277/630, 637, 641, 910  
See application file for complete search history.

(56) References Cited

U.S. PATENT DOCUMENTS

| | | | |
|---|---|---|---|
| 3,095,063 A * | 6/1963 | Maurice | 184/6.12 |
| 3,414,341 A | 12/1968 | Murphy | |
| 3,734,579 A | 5/1973 | Schumacher | |
| 3,811,744 A | 5/1974 | Wren et al. | |
| 3,844,631 A | 10/1974 | Otto et al. | |
| 4,162,812 A | 7/1979 | Takata et al. | |
| 4,372,674 A * | 2/1983 | Yukawa et al. | 399/47 |
| 4,427,242 A | 1/1984 | Otto | |
| 4,466,751 A | 8/1984 | Higuchi | |
| 4,640,559 A | 2/1987 | Crotti | |
| 4,932,796 A * | 6/1990 | Schurger et al. | 384/607 |
| 5,344,241 A | 9/1994 | Wells | |
| 5,435,655 A | 7/1995 | Wells | |
| 5,816,711 A | 10/1998 | Gingrich | |
| 6,102,580 A | 8/2000 | Alling et al. | |
| 6,361,049 B1 * | 3/2002 | Joco | 277/312 |

* cited by examiner

Primary Examiner—Thomas R Hannon  
Assistant Examiner—James Pilkington  
(74) Attorney, Agent, or Firm—Davis & Bujold, P.L.L.C.

(57) ABSTRACT

A sealed bearing includes a first race having a circumferential outer surface with a first portion of a first diameter and a second portion of a reduced diameter. A second race is provided having an circumferential outer surface with a first portion of a first diameter and a second portion of a reduced diameter. Rolling elements are positioned between the first race and the second race. A race retention sleeve is provided which engages the second portion of the first race and the second portion of the second race.

1 Claim, 2 Drawing Sheets

SEALED BEARING

FIELD

The present invention relates to a full complement tapered roller thrust bearing with a sealing design that provides both an outer debris barrier and prevents the bearing from disassembling during shipping, handling, and tool assembly.

BACKGROUND

The use of a full complement of tapered rollers in a thrust bearing assembly is necessary in a number of heavily loaded applications, such as oilfield rotating liner hangers. The full complement of tapered rollers in traditional designs have no method of retention and often fall out of the bearing during shipping, handling, and tool assembly.

SUMMARY

There is provided a sealed bearing which includes a first race having a circumferential outer surface with a first portion of a first diameter and a second portion of a reduced diameter. A second race is provided having an circumferential outer surface with a first portion of a first diameter and a second portion of a reduced diameter. Rolling elements are positioned between the first race and the second race. A race retention sleeve is provided which engages the second portion of the first race and the second portion of the second race.

BRIEF DESCRIPTION OF THE DRAWINGS

These and other features will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION

Figure 1:
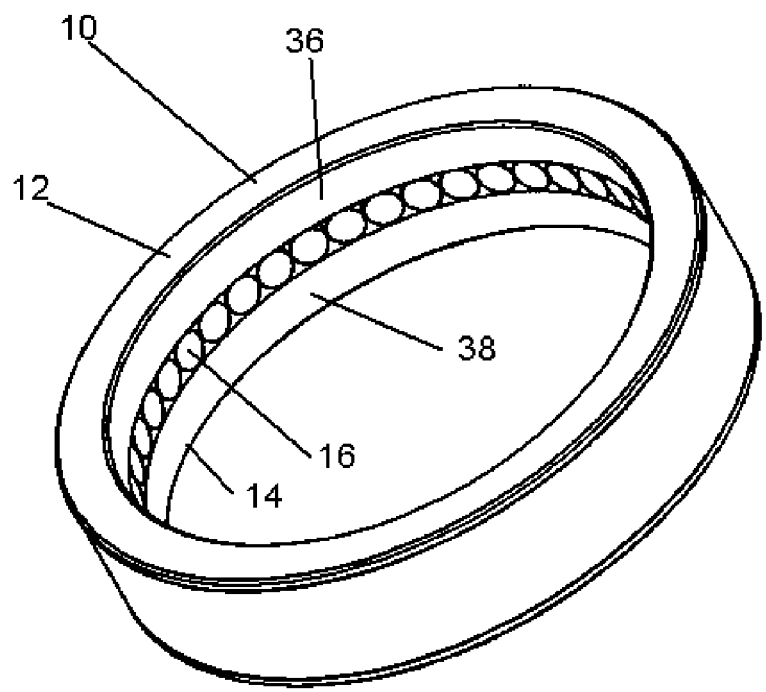
FIG. 1 is a perspective view of a sealed bearing.

A sealed bearing generally identified by reference numeral 10, will now be described with reference to FIG. 1 through 4.

Figure 2:
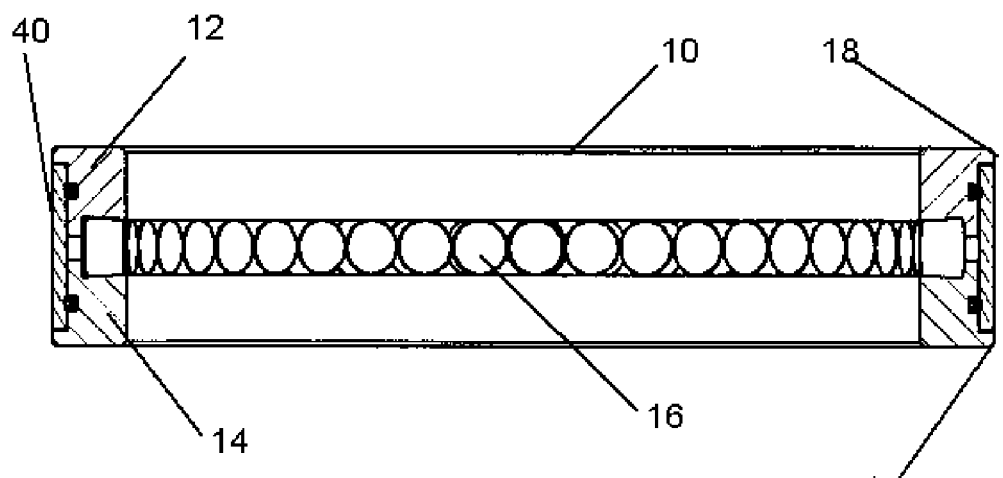
FIG. 2 is a side elevation view, in section, of the sealed bearing illustrated in FIG. 1.
Figure 3:
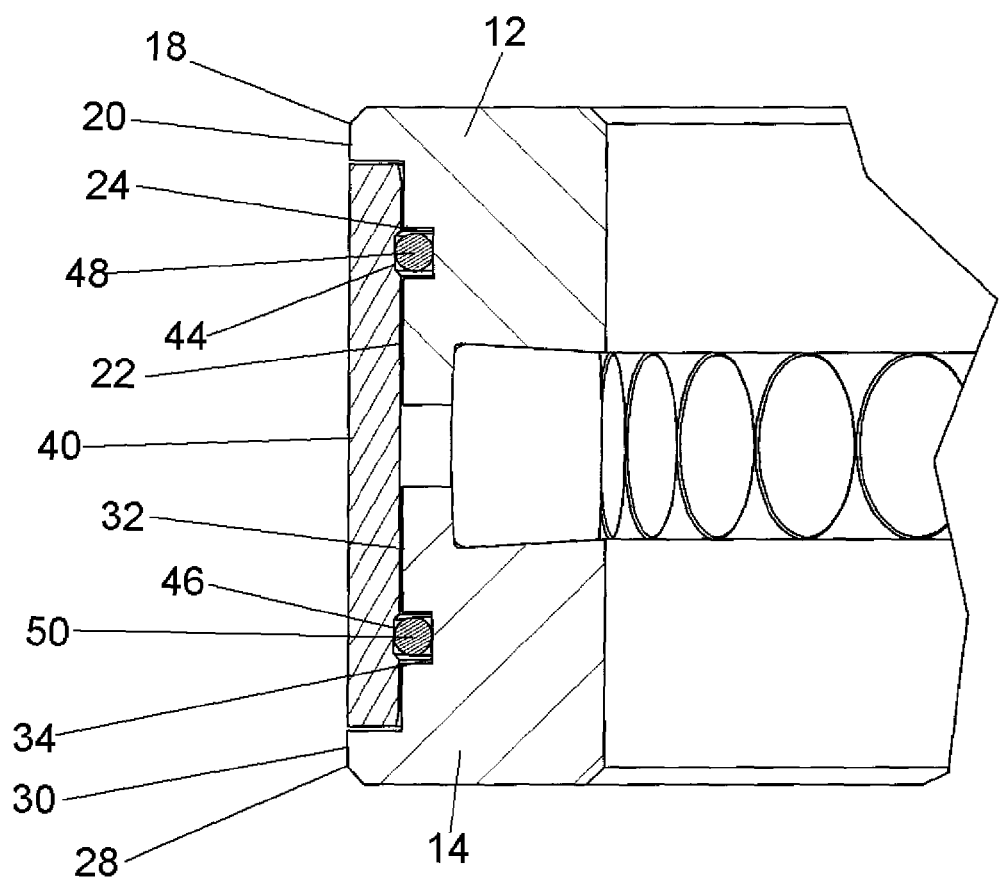
FIG. 3 is a detailed side elevation view, in section, of the sealed bearing illustrated in FIG. 2, showing details of the race retention sleeve.
Figure 4:
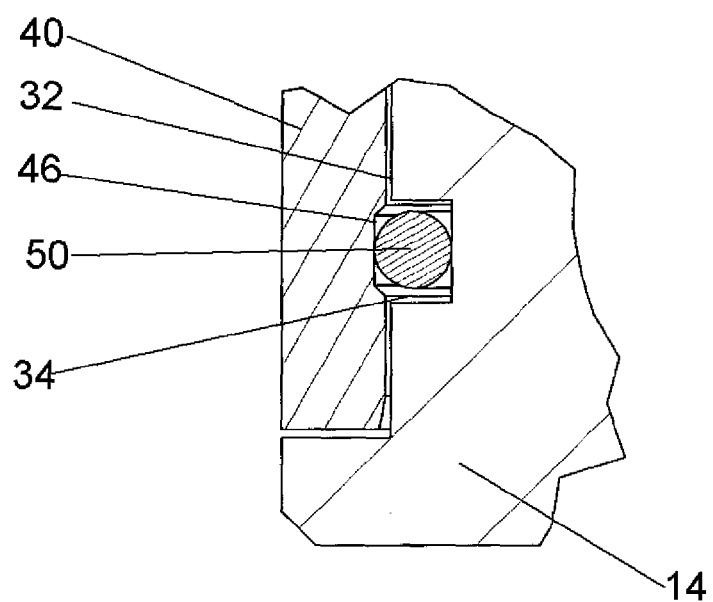
FIG. 4 is a detailed side elevation view, in section, of the sealed bearing illustrated in FIG. 2, showing details of the seal configuration.

Structure and Relationship of Parts:

Referring to FIG. 1 and FIG. 2, sealed bearing 10 has an upper or first race 12, a lower or second race 14 and a full complement of tapered rollers 16 as rolling elements. Referring to FIG. 3, first race 12 has a circumferential outer surface 18 with a first portion 20 of a first diameter and a second portion 22 of a reduced diameter. A first seal groove 24 encircles circumferential outer surface 18 on second portion 22 of first race 12. Second race 14 also has a circumferential outer surface 28 with a first portion 30 of a first diameter and a second portion 32 of a reduced diameter. A second seal groove 34 encircles circumferential outer surface 28 on second portion 32 of second race 14. Tapered rollers 16 are positioned between first race 12 and second race 14. Referring to FIG. 1, tapered rollers 16 are assembled into sealed bearing 10 on raceway surfaces of first race 12 and second race 14. First race 12 and second race 14 have outer thrust flanges, 36 and 38 respectively, which guide movement of tapered rollers 16. Referring to FIG. 3, a race retention sleeve 40 engages second portion 22 of first race 12 and second portion 32 of second race 14. Race retention sleeve 40 has an inner surface 42. A first circumferential recess 44 is provided in inner surface 42 of race retention sleeve 40 and a second circumferential recess 46 is provided on inner surface 42 of race retention sleeve 40 in parallel spaced relation to first circumferential recess 44. A first seal 48, in the form of an O ring, is positioned in first seal groove 24 encircling first race 12. A second seal 50, in the form of an O ring, is positioned in second seal groove 34 encircling second race 14. First seal 48 engages first circumferential recess 44 of race retention sleeve 40 and second seal 50 engages second circumferential recess 46 of race retention sleeve 40. Referring to FIG. 4, the positioning of second seal 50 in seal groove 34 is shown in enlarged detail, along with the engagement of second seal 50 with second circumferential recess in race retention sleeve 40.

Operation:

Referring to FIG. 1, tapered rollers 16 are assembled into sealed bearing 10, by insertion into first race 12 and second race 14. The movement of tapered rollers 16 on the raceway surfaces of first race 12 and second race 14 is guided by outer thrust flange 36 and 38, as is commonly practiced in a full complement tapered roller bearing. Referring to FIG. 3, race retention sleeve 40 engages second portion 22 of first race 12 and second portion 32 of second race 14. The nominal bore inner surface 42 of race retention sleeve 40 is sized for a snug but displaceable fit over first race 12 and second race 14. Referring to FIG. 3, first circumferential recess 44 and second circumferential recess 46 are provided on inner surface 42 of race retention sleeve 40 over the running location of first seal 48 and second seal 50, respectively, so that a lighter frictional contact is produced. During assembly of sealed bearing 10, race retention sleeve 40 is pressed over first seal 48 and second seal 50 until first seal 48 and second seal 50 snap into first circumferential recess 44 and second circumferential recess 46. The use of race retention sleeve 40 ensures that the bearing assembly is unitized and that tapered rollers 16 can not fall out of the bearing during shipping, handling, or installation of the tool. The use of one or more seals provides a barrier to the entry of debris.

Advantages:

The above described full complement tapered roller thrust bearing has a sealing design that provides both an outer debris barrier and prevents the bearing from disassembling during shipping, handling, and tool assembly. The bearing makes use of commonly available o-ring sizes to eliminate seal tooling costs and enables a wide variety of designs to be created for low volume production.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiments without departing from scope of the Claims.

What is claimed is:

1. A sealed bearing, comprising:
a first race having an circumferential outer surface with a first portion of a first diameter and a second portion of a reduced diameter;
a first seal groove encircling the circumferential outer surface on the second portion of the first race;
a second race having an circumferential outer surface with a first portion of a first diameter and a second portion of a reduced diameter;
a second seal groove encircling the circumferential outer surface on the second portion of the second race;
a plurality of rolling elements positioned between the first race and the second race; and
a race retention sleeve engaging the second portion of the first race and the second portion of the second race;
a first circumferential recess spaced inwardly on an inner surface of the race retention sleeve and a second circumferential recess spaced inwardly on the inner surface of the race retention sleeve in parallel spaced relation to the first circumferential recess;
a first O-ring seal positioned in the first seal groove and encircling the first race, and a second O-ring seal positioned in the second seal groove encircling the second race, the first O-ring seal engaging the first circumferential recess of the race retention sleeve and the second O-ring seal engaging the second circumferential recess of the race retention sleeve, the first O-ring seal and the second O-ring seal serving as a barrier to entry of debris and engaging the race retention sleeve to prevent loss of rolling elements through disassembly.

* * * * *